UNITED STATES PATENT OFFICE.

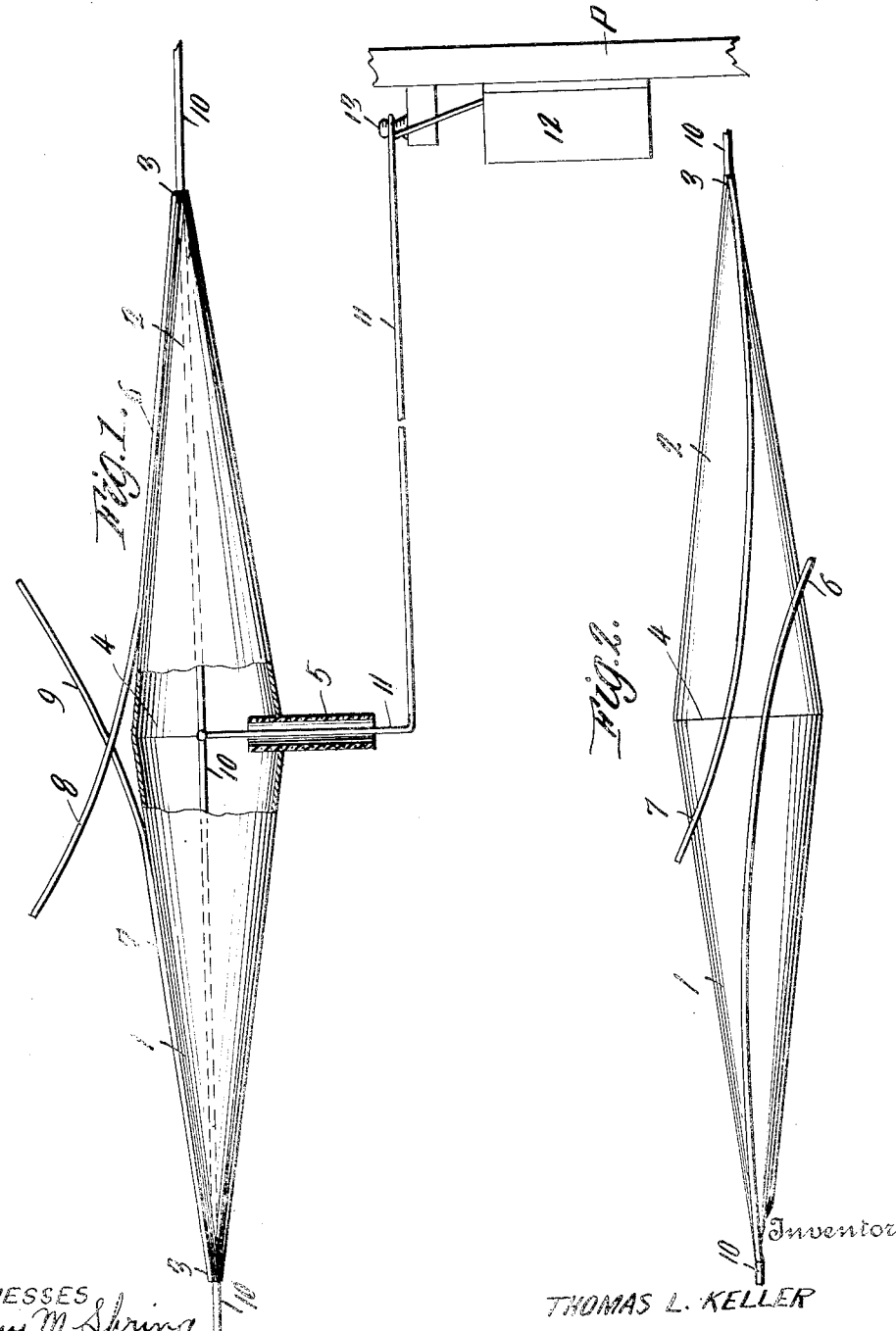

THOMAS L. KELLER, OF BRISTOL, PENNSYLVANIA.

LIGHTNING-ARRESTER.

1,363,124.　　　　Specification of Letters Patent.　　Patented Dec. 21, 1920.

Application filed May 8, 1919. Serial No. 295,597.

*To all whom it may concern:*

Be it known that I, THOMAS L. KELLER, a citizen of the United States, residing at Bristol, in the county of Bucks and State of Pennsylvania, have invented certain new and useful Improvements in Lightning-Arresters, of which the following is a specification.

This invention relates to a lightning arrester.

The main object of the invention is to provide an efficient device whereby lightning is prevented from entering a generator or transformer and burning out the coils, and which reliably and completely protects operators, linemen and others.

Another object is to provide a device of this character which may be used to switch the lightning from a line at any point and prevent it from leaving the main line and following a branch line.

Another object is to provide means whereby the insulators are protected against damage by lightning, means being provided to permit the lightning to explode into the atmosphere.

Another object is to provide a device of this character which when once installed, will require no further attention, being always ready to perform its function and which is capable of indefinite use.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation with parts broken out and in section of the device constituting this invention shown applied, and Fig. 2 is a top plan view thereof.

In the embodiment illustrated, the arrester constituting this invention is made in the form of a double cone, the members 1 and 2 of which taper toward their outer ends and are soldered at their apices as shown at 3 to the main conducting wire 10. The larger inner ends of these members 1 and 2 abut and are united as shown at 4. These sections 1 and 2 are composed of sheet copper and are designed to incase a portion of the conducting wire 10, being equipped midway its ends with a tube 5 of insulating material projecting laterally therefrom at any suitable point, being here shown arranged at the center of the device, and through which is designed to extend a branch wire 11 which may lead to a generator or transformer indicated at 12.

The generator 12 is shown mounted on a post P, which also carries an insulator 13 around which the branch wire 11 is wound.

Conducting wires 6 and 7 extend longitudinally of the arrester, being secured respectively to the sections 1 and 2 thereof, by any suitable means. These wires must be of at least the same size as the wire 10 which the device is designed to protect, and preferably they are made a little larger, and of copper wire, so as to conduct excessive current from the wire 10 and discharge it to the atmosphere over the ends 8 and 9 of said wires which are deflected laterally in opposite directions from each other and also project upwardly or outwardly relatively to the sections 1 and 2. As is shown clearly in Fig. 1, these wires 6 and 7 are separated from the sections 1 and 2 at points spaced from the larger ends thereof to permit the current passing thereover, to leave the sections 1 and 2 and pass out through the ends 8 and 9 of said wires.

From the above description, taken in connection with the drawings, it will be obvious that one of these arresters may be placed at any desired point on the main line 10 to protect any object connected with said line which may be an insulator, a transformer, a generator, or other object indicated at 12, to which current is conveyed by the branch wire 11 shown clearly in Fig. 1, the insulating tube 5 operating to insure the passage of the current from the wire 10 without its being deflected to the arrester.

By interposing this double cone shaped copper bypass at the connection of a branch wire 11 with the main line 10 passing said branch line through an insulated tube 5, the lightning coming in either direction on the main line will follow the cone and pass off to the atmosphere through wires 8 and 9 instead of passing into the cone along wire 10 and out through the branch pipe 11 to the object 12 to be protected. Should these bypasses or double cone shaped members be used in the line in connection with the lightning arrester they would be placed between the arrester and generator or other object 12 to be protected.

This device, while very simple and cheap to manufacture, after once being installed, requires no further attention and insures absolute safety to the operators, as well as to the generators, etc., to be protected.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A lightning arrester comprising a double cone-shaped member having conducting wires extending longitudinally from its ends toward its center with their inner ends extended outwardly away from each other and spaced laterally apart.

2. A lightning arrester comprising a double cone-shaped member having conducting wires extending longitudinally from its ends toward its center with their inner ends extended outwardly, said wires being secured to said member for a portion of its length, the inner ends of said wires being separated from said member and deflected laterally in opposite directions and extended outwardly.

3. A lightning arrester comprising a double cone-shaped member having conducting wires extending longitudinally from its tapered outer ends toward its center and secured thereto for a portion of their length, the inner ends of said wires being free from said member and deflected laterally in opposite directions, and a tube of insulating material projecting laterally through one side wall of said member.

In testimony whereof I affix my signature in presence of two witnesses.

THOMAS L. KELLER.

Witnesses:
ELWOOD D. TOLEN,
GEORGE M. VANZANT.